3,331,662
METHOD OF REMOVING IRON FROM ALUMINUM SULFATE SOLUTIONS

Harold L. Feller, Newark, Del., assignor to J. M. Huber Corporation, Locust, N.J., a corporation of New Jersey
No Drawing. Filed May 7, 1963, Ser. No. 278,783
5 Claims. (Cl. 23—123)

This application is a continuation-in-part of Ser. No. 226,456, filed Sept. 26, 1962, and now abandoned.

This invention relates to a process for the selective removal of iron values from aluminum sulfate liquors using liquid anion exchangers.

The use of liquid anion exchangers to remove relatively expensive metal values from various acid leach liquors is known. For example, known processes have been directed toward extracting metal values from acid leach liquors of uranium ores for the purpose of recovering valuable metals from the organic phase. The leach liquor is then discarded. However, no practical prior art methods are known for the extraction of inexpensive and undesirable metal contaminants from leach liquors.

When materials containing a high percentage of aluminum, for example, bauxite, kaolin clay, montmorillonite, nacrite, dickite, bentonite and the like are treated with sulfuric acid, the aluminum and iron values of the material are extracted or leached out in the form of aluminum sulfate, ferric sulfate and ferrous sulfate. The residual matter, usually silica and titania which are substantially insoluble in sulfuric acid and some unreacted alumina are either discarded or further refined for commercial uses.

The aluminum sulfate solution containing iron contaminants is unacceptable for many commercial uses, particularly if the iron values are high.

An effective practical method of removing these iron impurities from aluminum sulfate solutions has been long sought in vain by those skilled in the art.

I have discovered that by the use of an organic extractant as hereinafter described, iron impurities can be effectively removed from aluminum sulfate solutions to any degree required.

An object of this invention is to provide a method for the removal of iron impurities from aluminum sulfate solutions.

Another object of this invention is to provide clear, colorless aluminum sulfate solutions.

Previously, the processes directed to the use of liquid anion exchangers for extracting metals from metal salt liquors were concerned mainly with the recovery of valuable metals from the organic phase with the aqueous phase being discarded.

In the process of the present invention, it is the major component of the aqueous aluminum sulfate liquor which is of interest. Aluminum sulfate liquors containing dissolved iron impurities are of limited commercial value because of the contaminant. When the iron is dissolved in concentrated sulfate solutions, usually formed by the leaching of aluminum containing clays and ores, it forms a complex anionic radical. This can be illustrated by the following equations:

(1) $Fe_2(SO_4)_3 \rightarrow 2Fe^{+3} + 3SO_4^{-2}$
(2) $Fe^{+3} + 2(SO_4)^{-2}$ (excess) $\rightarrow Fe(SO_4)_2^{-1}$ In order for these anionic complexes to form in concentrated sulfate liquors it is necessary that the iron ions be in the ferric or trivalent state.

The process of this invention is best described in four steps: (1) Preparation of aluminum sulfate solution for removal of iron, (2) contacting of aluminum sulfate solution with liquid anion exchanger, (3) phase separation and (4) regeneration of the organic extractant.

(1) PREPARATION OF ALUMINUM SULFATE SOLUTION FOR REMOVAL OF IRON

The liquor resulting from the extraction of aluminum from aluminum containing clays and ores with sulfuric acid contains aluminum sulfate, some unreacted acid, ferrous and ferric sulfate and silica. The silica is removed prior to the extraction of iron in order to prevent the formation of stable silica-organic emulsions at the aqueous-organic interface.

All the iron values in the aluminum sulfate liquor are converted to ferric iron by contacting with an oxidizing agent. I have found that hydrogen peroxide is satisfactory for the purpose of this invention.

After the pretreatment of the aluminum sulfate liquor, a typical analysis is as follows:

$Al_2(SO_4)_3 \cdot 14H_2O$ --- 5.22 lbs./gal. (625.5 gms./liter).
Free acid ($H_2SO_4$) --- 0.029 lb./gal. (3.475 gms./liter).
Total iron as $Fe_2O_3$ -- 1.075 gms./liter.
pH ---------------- 1.

(2) CONTACTING OF ALUMINUM SULFATE SOLUTION WITH WEAK BASE SECONDARY AMINE LIQUID ANION EXCHANGER

Iron, in the form of an anionic complex, is extracted from the aluminum sulfate liquor by intimately contacting the liquor with a water insoluble weak base secondary amine liquid anion exchanger either by vigorous mechanical shaking, mixing, or by allowing the phases to flow countercurrently. In order to achieve optimum results, it is important that the liquid anion exchanger thoroughly contact the leach liquor. The time of contact is not as important as the thorough, intimate contacting since the ion exchange is instantaneous.

Generally, the liquid anion exchanger is added to the aluminum sulfate liquor although they can be commingled or the liquor can be added to the anion exchanger. The effective aqueous to organic phase ratios of the aluminum salt liquor to organic extractant vary according to the method of contacting and apparatus used. Generally, the important considerations are the extraction efficiency and economy of operation. These factors differ with each type of apparatus employed.

The concentration of the aluminum sulfate liquor is limited only by the adaptability of the solution to the various methods of contacting and different types of apparatus used. Usually, any concentration up to the saturation point of the salt solution is operable.

The weak base secondary amine liquid anion exchangers are dissolved in an organic solvent to facilitate handling. Since they are compatible with many organic solvents, the selection of a diluent is primarily a matter of economics and handling during use. The main criteria for an acceptable solvent in this process are water immiscibility, compatibility with the liquid anion exchanger and inertness. If these properties are present, then the organic phase will separate from the aqueous phase in a two phase system. While any organic solvent which fulfills these requirements is applicable, I have found kerosene or heptane to be suitable.

In many instances the organic solvent may impart an undesirable odor to the recovered aqueous phase. This can be overcome by deodorizing the aluminum sulfate liquor with activated charcoal. Another method is to use an oleophilic inorganic pigment. These pigments are usually formed by modifying the pigment surface, as an example, sodium alumino silicate pigments can be surface modified with a soya amine (Ethomeen).

If kerosene is used as the solvent for the anion exchanger, the odor can also be eliminated by using a purified odor free kerosene.

The concentration of the liquid anion exchanger does not have any specific effects on its iron removal ability. However, as a practical matter, the concentrations used depend upon the apparatus and method of contact, the viscosity of the organic phase and the ease of phase separation. For purposes of exemplification I use 0.05, 0.10, and 0.50 molar anion exchanger in kerosene. In order to speed up the phase separation, a small amount of a surfactant such as a higher alcohol can be used. This additive has no effect on the iron removal, its only effect is to decrease the time of the organic-aqueous phase separation.

Without intending to limit this invention to the concentrations of liquid anion exchanger exemplified, Table I illustrates the effect of concentration on iron removal.

TABLE I

[Extraction from aluminum sulfate using 0.05 molar liquid anion exchanger in kerosene]

| Initial Concentrations | | Equilibrium Concentrations | |
|---|---|---|---|
| Aqueous (g. Fe/l.) | A/O Ratio | Aqueous (g. Fe/l.) | Anion Exchanger (g. Fe/mole) |
| 0.750 | 1 | 0.480 | 5.4 |
| 0.480 | 1 | 0.250 | 4.6 |
| 0.250 | 1 | 0.150 | 2.0 |
| 0.150 | 1 | 0.080 | 1.4 |
| 0.080 | 1 | 0.014 | 1.2 |

[Extraction from aluminum sulfate using 0.10 molar liquid anion exchanger in kerosene]

| 0.750 | 1 | 0.330 | 4.20 |
| 0.330 | 1 | 0.100 | 2.20 |
| 0.100 | 1 | 0.050 | 0.50 |
| 0.050 | 1 | 0.025 | 0.25 |
| 0.025 | 1 | 0.006 | 0.15 |

[Extraction from aluminum sulfate using 0.50 molar liquid anion exchanger in kerosene]

| 0.750 | 1 | 0.200 | 1.100 |
| 0.200 | 1 | 0.058 | 0.280 |
| 0.058 | 1 | 0.018 | 0.080 |
| 0.018 | 1 | 0.010 | 0.016 |
| 0.010 | 1 | 0.003 | 0.014 |

The data in Table I indicates that by using a liquid anion exchanger to remove iron from alum solutions, the iron levels can be reduced to those commercially acceptable in iron free alums, e.g., 0 to 100 parts per million. The data also indicates that the 0.50 molar solution is the least efficient of the three tested.

The liquid anion exchangers operable in this invention are high molecular weight, oil soluble secondary amines of the weak base type. The structural configuration consists of two highly branched aliphatic chains attached to nitrogen atoms. An example of a liquid anion exchanger of this class is Amberlite LA-1, manufactured by Rohm and Haas Company of Philadelphia, Pa., and described in U.S. Patent 2,870,207. These anion exchangers are supplied in the form of free bases. The secondary amine anion exchanger is converted to the sulfate or bisulfate salt form in order to make it applicable to the process of this invention. This is accomplished by treating the amine with dilute sulfuric acid.

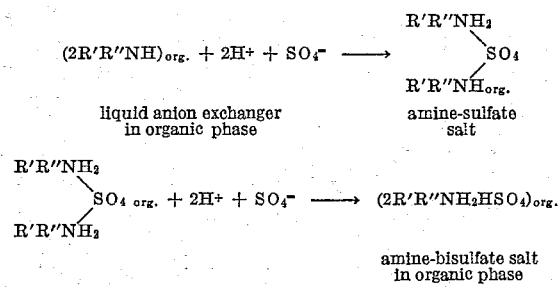

liquid anion exchanger in organic phase → amine-sulfate salt amine-bisulfate salt in organic phase In these equations $R'$ and $R''$ are highly branched aliphatic chains.

The following is a representative embodiment of the invention illustrating a multi-stage countercurrent extraction process.

*Example*

A multi-stage countercurrent extraction was run using 0.1 molar Amberlite LA-1 anion exchanger in kerosene and aluminum sulfate leach liquor at an aqueous to organic (A/O) phase ratio of 2. Contact was effected by intimate mixing for 2 hours on a mechanical shaker. The countercurrent extraction was carried out by introducing the fresh organic at one end of the system and the aluminum sulfate liquor at the other end. In this system the fresh Amberlite LA-1 is first contacted with the purest aluminum sulfate and passed countercurrently through the stages being discharged after contact with the incoming untreated aluminum sulfate liquor. Likewise, after contact with the spent anion exchanger, the aluminum sulfate liquor moves countercurrently through the system and is discharged after contact. As a result of this treatment the iron impurities in the aluminum sulfate solution were reduced to about 1 part per million.

The multi-stage countercurrent system was used with 0.2 molar Amberlite LA-1 at an A/O ratio of 2 with similar results.

The removal of iron from aluminum sulfate solutions using secondary amine liquid anion exchangers is best effected by contacting the liquor with the extractant in stages. In this way more iron can be removed than by a single contacting of the liquor with the organic extractant.

The removal of other impurities such as $TiO_2$ and soluble silica from the aluminum sulfate leach liquors is also accomplished and they are removed from the liquor in the same proportion as the iron impurities.

The loss of aluminum values from aluminum sulfate leach liquors was very slight as shown in Table II.

TABLE II

Aluminum Sulfate·$14H_2O$, lbs./gal.
Untreated alum _____ 5.22
Treated alum _____ 5.15

These values are average values after single contacts with 0.05, 0.10, 0.20, and 0.50 molar Amberlite LA-1 in kerosene.

(3) PHASE SEPARATION

In the aqueous-organic system of the present invention, the aluminum sulfate liquor comprises the aqueous phase while the extractant is contained in the lighter organic phase; after contacting the aqueous liquor with the organic extractant, the mixture is allowed to settle and a phase separation occurs in from 5 to 30 minutes in which the organic phase rises to the top accompanied by the appearance of a sharply defined interface. The ease and speed of the phase separation are a function of time of contact and concentration of the secondary amine liquid anion exchanger. For example, if the extractant and aluminum sulfate liquor are contacted on a laboratory shaker for over 5 minutes, the phase separation is not completed, even after 30 minutes of settling. If the concentration of the extractant is higher than about 1 molar in kerosene or other organic diluent, then the viscosity is so high that phase separation is impaired. The time and ease of phase separation can be significantly improved in these cases by dissolving 4% by weight of a higher alcohol in the secondary amine anion exchanger. The addition of the alcohol does not affect the iron removal capacity of the liquid anion exchanger but is advantageous where fast phase separation is required.

(4) REGENERATION OF THE ORGANIC EXTRACTANT

The organic extractant can be regenerated to 100% efficiency by conventional methods. The most effective method is to strip the iron values from the extractant by treating it with water. This breaks the anionic ferric sulfate complex which is stable only in concentrated sulfate liquor and the iron is removed from the extractant. It is not necessary to the practice of this invention to regenerate the organic extractant to 100% efficiency. The degree of regeneration needed to practice the invention depends primarily upon the economics of the process as related to the apparatus used, concentration of organic and aluminum sulfate solutions and the iron values to be removed. It is only necessary to regenerate to the degree which will provide the driving force necessary to remove iron from the aluminum sulfate solution being treated. Dilute sulfuric acid can also be used for stripping the iron values from the extractant.

The foregoing illustrates the invention as applied to aluminum sulfate solutions derived from leaching operations; however, the invention is not intended to be so limited since it is applicable to the removal of iron from aluminum sulfate solutions regardless of the source of the salt.

Additional modifications, obvious to those skilled in the art, may be made without departing from the substance of the invention as defined in the appended claims.

I claim:
1. The process for producing substantially iron-free aluminum sulfate, which comprises intimately contacting an iron containing aluminum sulfate solution, said iron being in the ferric state, with a weak base secondary amine liquid anion exchanger, allowing the organic phase and aqueous phase to separate into two layers and removing the substantially iron-free aqueous phase containing aluminum sulfate.

2. The process of producing substantially iron-free aluminum sulfate, which comprises intimately contacting an iron containing concentrated aluminum sulfate solution, said iron being in the ferric state, with a weak base secondary amine liquid anion exchanger in the sulfate salt form, allowing the organic phase and aqueous phase to separate into two layers and recovering the substantially iron-free aluminum sulfate as the aqueous phase.

3. The process of producing substantially iron-free aluminum sulfate, which comprises intimately contacting an iron containing aluminum sulfate solution, said iron being in the ferric state, with an organic extractant comprising a weak base secondary amine liquid anion exchanger in the sulfate salt form dissolved in a water immiscible organic solvent, allowing the organic phase and aqueous phase to separate into two distinct layers and recovering the substantially iron-free aluminum sulfate as the aqueous phase.

4. The process of removing iron values from aluminum sulfate solutions containing dissolved iron impurities which comprises converting all the iron values to the ferric form, contacting the aluminum sulfate solution with a weak base secondary amine liquid anion exchanger in the sulfate salt form dissolved in a water immiscible organic solvent, allowing the organic and aqueous phases to separate into two distinct layers, separating the aqueous phase from the organic phase and recovering the substantially iron-free aluminum sulfate.

5. The process according to claim 4 wherein the water immiscible organic solvent is kerosene.

References Cited
UNITED STATES PATENTS 2,877,250  3/1959  Brown et al. _____ 23—22 X

OTHER REFERENCES

Thomas et al.: "Development of the Alum-Amine Process for the Recovery of Alumina From Shade," The Canadian Journal of Chemical Engineering, volume 38, No. 6, December 1960, pp. 220–222.

OSCAR R. VERTIZ, *Primary Examiner.*

E. C. THOMAS, *Assistant Examiner.*